United States Patent
Herman (12)

(10) Patent No.: US 6,495,116 B1
(45) Date of Patent: Dec. 17, 2002

(54) NET SHAPE MANUFACTURING USING CARBON NANOTUBES

(75) Inventor: Frederick James Herman, Fort Worth, TX (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/546,081

(22) Filed: Apr. 10, 2000

(51) Int. Cl.$^7$ .................................................. D01F 9/12

(52) U.S. Cl. .................................................. 423/447.3

(58) Field of Search ...................................... 423/447.3

(56) References Cited

FOREIGN PATENT DOCUMENTS

| WO | WO 00 65821 | 12/1999 |
|----|-------------|---------|
| WO | WO 00 19494 | 4/2000 |
| WO | WO 00 63115 | 10/2000 |

OTHER PUBLICATIONS

Richard E. Smalley and Daniel T. Colbert, "Self–Assembly of Fullerene Tubes and Balls," *The Robert A. Welch Foundation 39th Conference on Chemical Research: Nanophase Chemistry*. Houston, TX, Oct. 23–24, 1995, pp. 1–14.

P.M. Ajayan, T. W. Ebbesen, T. Ichihashi, S. Iijima, K. Tanigaki & H. Hiura, "Opening Carbon Nanotubes with Oxygen and Implications for Filling," *Nature*, vol. 362, Apr. 8, 1993, pp. 522–525.

X. K. Wang, X. W. Lin, V. P. Dravid, J. B. Ketterson, and R. P. H. Chang,, "Growth and Characterization of Bucky-bundles," Materials Research Center, Northwestern University, Evanston, Illinois, *American Institute of Physics—Appl. Phys. Lett. 62*, Apr. 19, 1993, pp. 1881–1883.

Faye Flam, "Condensed Matter Physicists Shrink Their Horizons", *Science*, vol. 260, Apr. 9, 1993, pp. 164–165.

S. C. Tsang, P. J. F. Harris & M. L. H. Green, "Thinning and Opening of Carbon Nanotubes by Oxidation Using Carbon Dioxide," *Nature*, vol. 362, Apr. 8, 1993, pp. 520–522.

S. Amelinckx, X. B. Zhang, D. Bernaerts, X. F. Zhang, V. Ivanov, J. B. Nagy, "A Formation Mechanism for Catalytically Grown Helix–Shaped Graphite Nanotubes," *Science*, vol. 265, Jul. 29, 1994, pp. 635–639.

T. W. Ebbesen & P. M. Ajayan, "Large–Scale Synthesis of Carbon Nanotubes", *Nature*, vol. 358, Jul. 16, 1992, pp. 220–222.

M. José–Yacamá, M. Miki–Yoshida, and L. Rendón, and J. G. Santiesteban, "Catalytic Growth of Carbon Microtubles with Fullerene Structure", *American Institute of Physics—Appl. Phys. Lett. 62*, Feb. 8, 1993, pp. 657–659.

Yoshinori Ando and Sumio Iuima, "Preparation of Carbon Nanotubes by Arc–Discharge Evaporation", *Jpn. J. Appl. Phys.*, vol. 32, Jan. 15, 1993, pp. 107–109.

B. I. Yakobson, C. J. Brabec, and J. Bernhole, "Nanomechanics of Carbon Tubes: Instabilities Beyond Linear Response," *Physical Review Letters, The American Physical Society*, vol. 76, No. 14, Apr. 1, 1996, pp. 2511–2514.

A. Maiti, C. J. Brabec, and J.Bernhole, "Structure and Energetics of Single and Multilayer Fullerence Cages," *Physical Review Letters, The American Physical Society*, vol. 70, No. 20, May 1993: 3023–3026.

Sumio Ijima, P. M. Ajayan, and T. Ichiha, "Growth Model for Carbon Nanotubes," *Physical Review Letters, The American Physical Society*, vol. 69, No. 21, Nov. 1992: 3100–3103.

A. Maiti, C. J. Brabec, and J.Bernhole, "Growth Energetics of Carbon Nanotubes," *Physical Review Letters, The American Physical Society*, vol. 73 No. 18, Oct. 1994: 2468–2471.

Boris I. Yakobson and Richard E. Smalley, "Fullerene Nanotubes: $C_{1,000,000}$ and Beyond", *American Scientist*, vol. 85, Jul.–Aug. 1997: 324–337.

Junzo Ishikawa, "Negative Ion Beam Technology For Materials Science (invited)," *Rev. Sci. Instrum.* 63, Apr. 1992: 2368–2373.

W. Ensiger, "Ion Sources For Ion Beam Assisted Thin–Film Deposition," *Rev. Sci. Instrum.*, 63, Nov. 1992: 5217–5233.

J. Tersoff and R. S. Ruoff, "Structural Properties of a Carbon–Nanotube Crystal," *Physical Review Letters, The American Physical Society*, vol. 73, No. 5, Aug. 1994: 676–679.

Frederick T. Wallenberger, Paul C. Nordine, Mats Boman, "Inorganic Fibers and Microstructures Directly from the Vapor Phase," *Composites Science and Technology*, vol. 51, 1994: 193–212.

Frederick T. Wallenberger and Paul C. Nordine, "Strong, Pure, and Uniform Carbon Fibers Obtained Directly from the Vapor Phase," *Science*, vol. 260, Apr. 1993: 66–68.

Michael C. Wanke, Olaf Lehmann, Kurt Müller, Qingzhe Wen, Michael Stuke, "Laser Rapid Phototyping of Photonic Band–Gap Microstructures," *Science*, vol. 275, Feb. 1997: 1284–1286.

(List continued on next page.)

*Primary Examiner*—Stuart L. Hendrickson
(74) *Attorney, Agent, or Firm*—Jackson Walker, L.L.P.

(57) ABSTRACT

The present invention provides methods and systems for net shaped manufacturing using carbon nanotubes. Generally, an automatic control unit is used to place reaction units in the proper location to produce a component part of carbon nanotubes in a predetermined configuration. The reaction units include a carbon vaporization unit, a carbon feed/injection unit and a gas pressure/temperature control isolation unit. The carbon feed/injection unit advantageously operates to inject carbon based materials (e.g., graphite powder, solid graphite or carbon based gas) into an reaction area at a predetermined rate in which the carbon vaporization unit provides energy capable of dissociating carbon atoms from the injected carbon based material to produce a predetermined concentration of carbon vapor within the reaction area. The gas pressure/temperature control isolation unit operates to control the pressure and temperature of the reaction area to promote the growth of carbon nanotubes.

17 Claims, 1 Drawing Sheet

OTHER PUBLICATIONS

G. Che, B. B. Lakshmi, C. R. Martin, and E. R. Fisher, Rodney S. Ruoff, "Chemical Vapor Deposition Based Synthesis of Carbon Nanotubes and Nanofibers Using a Template Method," *Chem. Mater., American Chemical Society*, 1998: 260–267.

Jing Kong, Hyongsok T. Soh, Alan M. Cassell, Calvin F. Quate, Hongjie Dai, "Synthesis of Individual Single–Walled Carbon Nanotubes on Patterned Silicon Wafers," *Nature*, vol. 395, Oct. 1998: pp. 878–881.

Z. F. Ren, Z. P. Huang, J. W. Xu, J. H. Wang, P. Bush, M. P. Siegal, P. N. Provencio, "Synthesis of Large Arrays of Well–Aligned Carbon Nanotubes on Glass," *Science Magazine*, vol. 282, No. 5391, Nov. 1998: 1–87.

Z. P. Huang, J. W. Xu, Z. F. Ren, and J. H. Wang, M. P. Siegal and P. N. Provencio, "Growth Of Highly Oriented Carbon Nanotubes By Plasma–Enhanced Hot Filament Chemical Vapor Deposition," *Appl. Phys. Lett.*, vol. 73, No. 26, Dec. 1998: 3846.

Richard E. Smalley and Boris I Yakobson, "The Future of the Fullerenes," *Solid State Communications*, vol. 107, No. 11, 1998: 597–606.

Marco Buongiorno Nardelli, B. I. Yakobson, and J. Bernholc, "Brittle and Ductile Behavior in Carbon Nanotubes," *Physical Review Letter, The American Physical Society*, vol. 81, No. 21, Nov. 1998: 4656–4659.

O. Lourie and H. D. Wagner, "Evaluation of Young's Modulus of Carbon Nanotubes by Micro–Raman Spectroscopy," *J. Mater. Res.,Materials Research Society*, vol. 13, No. 9, Sep. 1998: 2418–2422.

D. D. L. Chung and Shoukai Wang, "Carbon Fiber Polymer–Matrix Structural Composite As A Semiconductor And Concept Of Optoelectronic And Electronic Devices Made From It," *Smart Mater. Struct. 8*, 1999: 161–166.

Ray H. Baughman, Changxing Cui, Anvar A. Zakhidov, Zarar Iqbal, Joseph N. Barisci, Geoff M. Spinks, Gordon G. Wallace, Alberto Mazzoldi, Danilo De Rossi, Andrew G. Rinzler, Oliver Jaschinski, Siegmar Roth, Miklos Kertesz, "Carbon Nanotube Actuators," *Science*, vol. 284, May 1999: 1340–1344.

P. Chen, X. Wu, J. Lin, K. L. Tan, "High $H_2$ Uptake by Alkali–Doped Carbon Nanotubes Under Ambient Pressure and Moderate Temperatures," *Science*, vol. 285, Jul. 1999: 91–93.

David Tománek, "Behavior of Nanotube Devices under Normal and Extreme Conditions," *(Department of Physics and Astronomy), Michigan State University*, 2000: 1–42.

NET SHAPE MANUFACTURING USING CARBON NANOTUBES

BACKGROUND OF THE INVENTION

1. Technical Field of the Invention

This invention relates to manufacturing carbon based materials and, more particularly, to a method and system for net shape manufacturing using carbon nanotubes.

2. Background of the Invention

In addition to the more common allotropes of carbon, namely diamond and graphite, there exist a third form which forms a network of structures called fullerenes. The best known, discovered in 1985, is called the Buckyball or to give its technical name Buckminsterfullerene. A Buckyball structure is a pure carbon molecule comprising exactly sixty carbon atoms. Generally, each carbon atom is bonded to three other carbon atoms in the form of a spherical structure. Recent research has identified another type of fullerene which appears as a hollow tubular structure known as the nanotube. The carbon nanotube appears as an elongated fiber and yet it is hollow and inherits the perfection of atomic arrangements made famous by its predecessor the Buckyball. Carbon nanotubes consist of two dimensional hexagonal sheets folded together and capped at both ends by a fullerene cap. There length can be millions of times greater than their small diameter. Thus, carbon nanotubes are effectively Buckyball structures extended out as long strands rather than spheres.

Development of carbon molecular growth began with the manufacture of carbon fibers and, while these conventional carbon fibers are readily made very long, the graphite sheets within the carbon fibers are either not closed tubes or do not extend continuously along the length of the fiber. The result is sharply decreased tensile strength, electrical conductivity and chemical resistance compared to a carbon nanotube. Thus, development of fullerenes, such as carbon nanotubes, has continued in an effort to develop materials with improved physical properties.

Carbon nanotubes exhibit mechanical, electronic and magnetic properties which are in tuneable by varying the diameter, number of concentric shelves and orientation of the fibers. Practical carbon nanotube based materials require eliminating defects and other reaction products, maximizing the nanotube yield, and synthetically controlling the tube length and orientation. Currently there exist three primary methods for producing carbon nanotubes. These methods include, for example, Electric Arc Discharge, Resistive Heating and Laser Ablation.

The Electric Arc Discharge process works by utilizing two carbon (graphite) electrodes in an arc welding type process. The welder is turned on and the rod ends are held against each other in an argon atmosphere to produce or grow carbon nanotubes. The yield rate of carbon nanotubes of this process is extremely low and the growth of the carbon nanotube orientation are random in nature delivering only undefined configurations of growth material.

In Resistive Heating type processes, the fullerenes are formed when a carbon rod or carbon containing gas is dissociated by resistive heating under a controlled atmosphere. A resisted heating of the rod causes the rod to emit a faint gray white plum soot like material comprising fullerenes. The fullerenes collect on glass shields that surround the carbon rod and must be separated from non-desirable components in a subsequent process. Again, the yield rate of the carbon nanotubes is extremely low and orientation is random delivering only undefined configurations of growth material.

The Laser Ablation batch type process works by ablating a graphite target containing a small metal particle concentration with a pulsed laser while providing a temperature controlled space for the carbon atoms and carbon vapor to combine to grow a fullerene structure such as a nanotube. The fullerene structure falls out in a type of carbon soot. The desired fullerene structure is subsequently extracted from the soot by an acid reflux cleaning system. Although the Laser Ablation process has experienced an improved yield rate, relative to the above-mentioned processes, this batch type process approach is uneconomical for use in industrial application because there currently exist no method for controlling the orientation and shaping of the carbon nanotubes. None of the above-mentioned batch methods are used to delivered large-scale production of carbon nanotubes or crystalline type carbon nanotubes with a defined orientation in a net shape type manufacturing arrangement.

The above-mentioned and other disadvantages of the prior art are overcome by the present invention, for example, by providing a method and system for net shape manufacturing using carbon nanotubes.

SUMMARY OF THE INVENTION

The present invention achieves technical advantages as a method and system for net shaped manufacturing using carbon nanotubes. An automatic control unit is used to place reaction units in the proper location to produce a component part of carbon nanotubes in a predetermined shape. The reaction units include a carbon vaporization unit, a carbon and catalyst feed/injection unit and a gas pressure/temperature control isolation unit. The carbon /catalyst feed/injection unit advantageously operates to inject carbon based materials (e.g., graphite powder, solid graphite or carbon based gas) into an reaction area at a predetermined rate in which the carbon vaporization unit provides energy capable of dissociating carbon atoms from the injected carbon based material to produce a predetermined concentration of carbon vapor within the reaction area. The gas pressure/temperature control isolation unit operates to control the pressure and temperature of the reaction area to promote the growth of carbon nanotubes.

Among the new advantages of the present invention are: First, preferentially oriented carbon nanotubes can more economically be fabricated into component parts; And, since preferentially oriented carbon nanotubes exhibit both superior strength and electrical conductivity, stronger structural materials can be fabricated into a component which utilizes both structural advantages and electronic applications.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses of innovative teachings herein. In general, statements made in the specification of the present application do not necessarily delimit any of the various claimed inventions. Moreover, some statements may apply to some inventive features but not to others.

Figure 1:
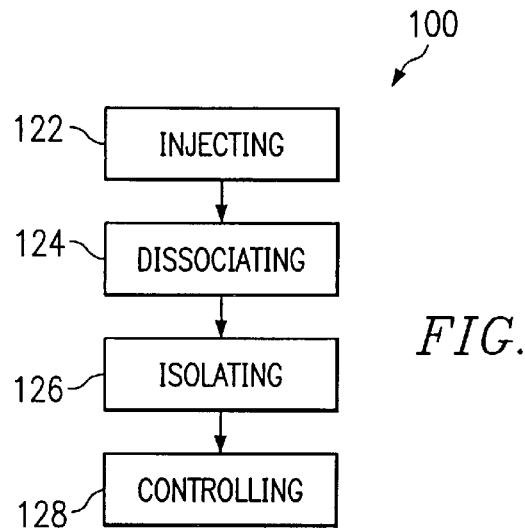
FIG. 1 illustrates a flowchart of a method for net shape manufacturing using carbon nanotubes in accordance with the present invention.

Referring now to the Drawings, and more particularly, to FIG. 1, there is illustrated a method of manufacturing using carbon nanotubes in accordance with the present invention. The process begins with an injection step 122. In the injection step 122, carbon based material is injected into a reaction area for further operations to be performed. The reaction area is the area in which carbon nanotubes nucleate or grow. The carbon based material is the feed stock for carbon atoms necessary for the nucleation of carbon nanotubes. In a preferred embodiment, the carbon based material is a pure carbon molecule. However, the feed stock can be a combination of carbon and other types of material. The carbon based material can be, for example, a powder, solid or gaseous form (such as graphite powder, solid carbon rod or carbon gas).

Next, in a dissociation step 124, carbon atoms are dissociated or vaporized from the carbon based feed stock which is injected into the reaction area. Dissociation is attained by heating the carbon based feed stock to a temperature sufficient to form a carbon vapor. The temperature will depend on the type of carbon based feed stock used, however, temperatures can range from 800° C. to 3000°C. These temperatures can be attained through the use of, for example, electric arc discharge electrodes, resistive heating elements, laser, electron beam or other heating type processes.

In an isolating step 126, the reaction area is maintained under a controlled pressure and temperature profile. The controlled pressure is used to control the location of the dissociated carbon atoms at an optimum distance from the nucleating carbon nanotubes. The absolute pressure of the atmosphere selected to form carbon nanotubes can be a minimum of 0.001 Torr and can range up to a maximum of 20,000 Torr. Lower pressures produce carbon vapors having a lower carbon concentration, which allows production of carbon nanotubes with predetermined orientations. Smaller diameter carbon nanotubes can be attained at higher pressures. Also, although the dissociated carbon vapor will initially reside at very high temperatures, the carbon vapor needs to be cooled at. a controlled rate to reach an energy state to allow the vapor to form into a predetermined solid nanotube structure. In the isolating step 126, the pressure controlled area can be temperature controlled to allow a gradual cooling from the initial temperature needed to dissociated the carbon atoms.

Finally, in a controlling step 128, the above-mentioned reaction components (i.e., injection step 122, dissociation step 124 and isolating step 126) are precisely and accurately placed in a location predetermined by the configuration of a component part to be fabricated. A component part is fabricated by stacking multiple cross-sectional layers of carbon nanotubes until the component part is completed in a predetermined physical shape. Thus, this control type system is based upon material additive layer manufacturing. The process can be computer aided by first decomposing the predetermined shape into very thin cross-sectional layers and subsequently placing the reaction components in the proper locations to fabricate each cross-sectional layer from carbon nanotubes. Subsequent cross-sectional layers are stacked on the previous cross-sectional layer. The growth of previously deposited carbon nanotubes can be continued with each subsequent cross-sectional layer.

In another embodiment, to control nucleation of carbon nanotubes with a predetermined physical properties, a catalyst or metal compound or material can be combined with the carbon based feed stock. The carbon based feed stock and the metal material, when used, is combined prior to dissociation step 124. The combination can be made, for example, by mixing graphite with the metal material and then processing the relatively homogenous mixture into a rod in accordance with methods known in the art. The rod containing the combination carbon and metal material is then utilized in the dissociation step 124 described herein. However, a carbon based feed stock and a metal based feed stock can be dissociated in separate steps and subsequently placed in the reaction area. Additionally, the type and concentration of metal material can be varied during the fabrication process of the component part to allow further variance of the physical properties of the carbon nanotubes.

For example, the process works by injecting methane gas into the reaction area and dissociating the methane gas into ionized hydrogen and carbon atoms. When this is done in the presence of a metallic particle the ionized carbon atoms cover the surface area of the metallic particle. When the carbon atoms on the metallic particle come in contact with each other, they form covalent bonds in the most energetically stable formation. By choosing a metallic particle of the predetermined shape and size, carbon nanotubes form with defined diameters and physical properties. As a carbon nanotube is formed and it separates from the metallic particle, the carbon on the surface area of the metallic particle is replaced with more ionized carbon. Thus, the reaction can continue indefinitely until one of the following occurs: 1) the carbon feed stock is withheld from the reaction area; 2) the reaction isolation conditions are changed so that the formation of carbon nanotubes is no longer favorable; or 3) the concentration of metallic particles are increased to allow the metallic particles to come in contact with each other and grow to a size or shape that does not allow further growth of the carbon nanotubes. Also, In situ diagnostics can be used to evaluate the carbon nanotube growth process. Thus, the nucleation of the carbon nanotubes can be varied to allow custom tailoring of the physical properties in real time. In situ diagnostics is the process of evaluating chemical reactions as they occur to determine their exact conditions in terms of their energy, chemical reactants, growth orientation, etc.

Figure 2:
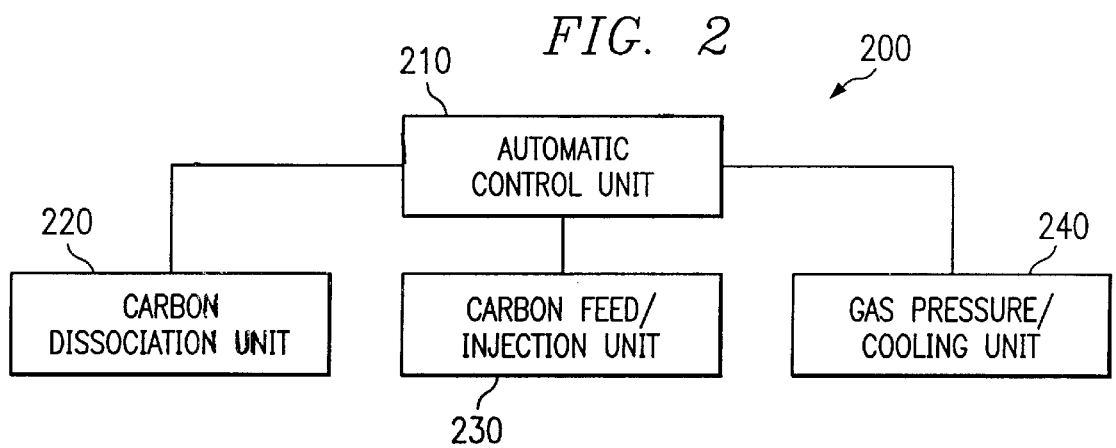
FIG. 2 illustrates one embodiment of a system architecture embodying the present invention.

Now referring to FIG. 2, there is illustrated a system 200 for net shape manufacturing using carbon nanotubes in accordance with the present:invention. The system 200 comprises an automatic control unit 210 and reaction units which includes a carbon feed/injection unit 230, a carbon dissociation unit 220 and a gas pressure/temperature control isolation unit 240.

The carbon feed/injection unit 230 is used to inject a carbon based material into a predetermined area for further operations to be performed. The carbon based material is the feed stock for carbon atoms necessary for the nucleation of carbon nanotubes. The injection rate is controlled by and through communication with the automatic control unit 210. In a preferred embodiment, the carbon based material is a pure carbon molecule. However, the feed stock can be a combination of carbon and other types of material. The carbon based material can be, for example, a powder, solid or gaseous form (e.g., graphite powder, solid carbon rod or carbon gas). The carbon feed/injection unit 230 can be equipped with a type of hopper which allows the continuous injection of feed stock without requiring the manufacturing system to slow or pause for the reloading of feed stock.

The carbon dissociation unit 220 dissociates carbon atoms from the feed stock which is injected into the predetermined area. Dissociation is attained by heating the carbon based feed stock to a temperature sufficient to form a carbon vapor. The carbon dissociation unit 220 is capable of providing enough energy to vaporizing the feed stock into carbon molecules. The carbon dissociation unit 220 can comprise, for example, electric arc discharge electrodes, resistive heating elements, laser, electron beam or other heating type process. Energy level output, of the carbon dissociation unit 220, is controlled and varied by and through communication with the automatic control unit 210.

The gas pressure/temperature control isolation unit 240 is capable of varying the pressure and temperature of an predetermined area. Varying the pressure is effectuated by evacuating or pumping a gas, preferably an inert gas, into the predetermined area. Inert gases include, for example, helium, argon and xenon. Other gases, which are not reactive with the vaporized carbon can be used. The pressure can be varied from about 0.001 Torr to 20,000 Torr. Pressure and temperature, of the gas pressure/temperature control unit 240, is controlled and varied through communication with the automatic control unit 210.

Although the dissociated carbon vapor will initially reside at very high temperatures, the carbon vapor needs to be cooled at a controlled rate to reach an energy state to allow the vapor to form into a predetermined solid nanotube structure. The gas pressure/temperature control unit 240 comprises a heating device (not shown) to heat the pressure controlled area at temperatures which allow a gradual cooling from the initial temperature needed to dissociated the carbon atoms.

Finally, the automatic control unit 210 precisely and accurately places the above-mentioned reaction units 220, 230,240 in a predetermined area to nucleate carbon nanotubes into the configuration of a component part. The component part is fabricated by stacking multiple cross-sectional layers of carbon nanotubes until the component part is completed in a predetermined physical shape. The automatic control unit 210 can be computer aided to allow the configuration of the component part to be decomposed into very thin cross-sectional layers. Subsequently, the automatic control unit 210 places the reaction units 220, 230, 240 in a pattern of reaction areas determined by the decomposed cross-sectional layers. Carbon nanotubes are nucleated in the multiple reaction areas to form the shape of each cross-sectional layer pattern. Each subsequent cross-section is stacked upon the previous cross-sectional layer. Thus, the component part is fabricated by multiple stacked cross-sectional layers of nucleated carbon nanotubes. Growth of previously deposited carbon nanotubes can be continued with the stacking of each subsequent cross sectional layer and additional layers of newly nucleated carbon nanotubes can also be added.

In another embodiment, the net shape manufacturing system 200 can include a substrate (not shown) to support the nucleating carbon nanotubes. Layers of sacrificial substrates can also be simultaneously built up to support more complex component part configurations. The substrate can be embedded with seed particles to assist the growth of the nanotubes. The seed particles, such as carbon nanotubes or selected metal particles, are arranged in a pattern consistent with the predetermined configuration of the component part to be fabricated.

The strength of the component part can be improved by defining the orientation of the nucleating nanotubes. When large bundles of carbon nanotubes row together, they eventually form a macroscopic crystal. However, this type of crystal is not expected to have good bulk mechanical strength when compared to single carbon nanotubes. The bonds that hold the individual carbon nanotubes together in the bundles are week Van der Waals bonds. Essentially, these lateral bonds form slip planes in which bulk material failure could occur. The automatic control unit 210 is capable of placing and controlling the reaction units 220, 230, 240 to nucleated helical growth of short length carbon nanotubes such that each successive layer of the helix blocks the slip plane of the previous layer. In addition to the helical growth technique, the growth direction vector of the crystal can be changed (either allowed to happen randomly or in a controlled manner) such that dislocation between individual carbon nanotubes are not allowed to propagate through out the crystal. In either the random or controlled manner, the growth properties are maintained to ensure uniform mechanical and electrical properties. Thus, the problems encountered with slip planes can be reduced or eliminated by using the above-described net shape manufacturing system to control the carbon nanotube growth in a component part. Additionally, the automatic control unit 210 can use in situ diagnostics to evaluate the carbon nanotube growth in real time and adjust during processing to control and vary the physical properties of the carbon nanotubes.

Figure 3:
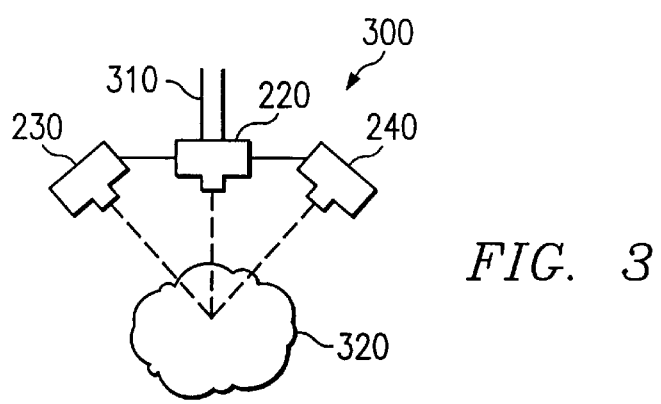
FIG. 3 is an exemplary illustration of a synthesis head which can be used to implement the present invention.

Now referring to FIG. 3, there is illustrated a synthesis head 300 which can be used in net shape manufacture using carbon nanotubes in accordance with the present invention. A control arm 310 is coupled to the reaction units 220, 230, 240. The control arm 310 can be, for example, a 5 or 6 axis rotating type arm. The movement of the control arm 310 is controlled by the automatic control unit 210 (FIG. 2) through a wireline or wireless type connection. The automatic control unit 210 instructs the control arm to place the reaction units 220, 230, 240 such that carbon nanotube nucleation is effectuated in the reaction area 320. Thus, the reaction area 320 can be continuously maneuvered in the pattern determined by the decomposed cross-sectional layers.

Preferentially grown carbon nanotubes add tremendous capability and functionality to materials and systems. For example, carbon nanotubes for use as structural materials show strength to weight ratios of up to 126 to 1 over titanium and 142 to 1 over aluminum. Economic analysis indicates that this weight savings translates into. large production cost reductions depending on the production rate. Along with use as a structural material, carbon nanotubes have many other attributes that increase the capabilities of materials and systems.

Additionally, the carbon atomic bonds of carbon nanotubes can be arranged in a multitude of ways giving the nucleated carbon nanotubes conductivities ranging from an insulator to a semiconductor to a metallic conductor. This range of conductivity is due to the helical symmetry or chirality of the nanotubes. Thus, the present invention can be used to integrate both structural and electronic advantageous characteristics at the same time or within the same component part. As the cross-sectional layers are added, physical properties can be varied by individual control of the reaction units 220, 230, 240. By custom tailoring physical properties of individual or groups of carbon nanotubes, multi-functionality can be achieved for applications such as electronics, electrical routing, piezoelectric and power storage systems. Thus, physical structures, such as aerospace wing structures, can be produced with embedded electronics type circuits. Assuming conventional manufacturing methods could be used to fabricate these type products, such methods would in all probability require additional time consuming operations, including the need for custom fixturing and tooling, high strength material joining processes, and complex assembly operations.

Although a preferred embodiment of the method and system of the present invention has been illustrated in the accompanied drawings and described in the foregoing detailed description, it is understood that the invention is not limited to the embodiment disclosed, but is capable of numerous rearrangements, modifications, and substitutions without departing from the spirit of the invention as set forth and defined by the following claims.

What is claimed is:

1. A method of manufacturing a component part having a predetermined configuration using carbon nanotubes, comprising the steps of:
   injecting carbon based material into a reaction area at a predetermined rate;
   dissociating carbon atoms from said carbon based material at a predetermined rate;
   maintaining the reaction area at a predetermined temperature and a predetermined pressure, wherein said carbon nanotubes nucleate in said reaction area;
   performing said injecting, dissociating and maintaining steps to nucleate said carbon nanotubes in said predetermined configuration; and
   repeating said step of performing said injecting, dissociating and maintaining for multiple cross-sectional layers with successive cross-sectional layers stacked on previous cross-sectional layers, wherein said predetermined configuration is determined by said multiple cross-sectional layers.

2. The method of claim 1 further comprising the step of adjusting the growth direction of said carbon nanotube during a growth period.

3. The method of claim 1 further comprising the step of varying the rate of injection of said carbon based material.

4. The method of claim 1 further comprising the step of varying the rate of dissociation from said carbon based material.

5. The method of claim 1 further comprising the step varying said predetermined pressure and predetermined temperature.

6. The method of claim 1, wherein the step of dissociating is effectuated by a laser, an electron beam, or an electrical arc discharge unit.

7. The method of claim 1, wherein said carbon based material further comprises a metal based material.

8. The method of claim 7, further comprising the step of varying the concentration of said metal based material.

9. The method of claim 1 further comprising the steps of:
   injecting a carbon based material having a first metal based material; and
   injecting a second carbon based material having a second metal based material.

10. A method of manufacturing a component part having a predetermined configuration using carbon nanotubes, comprising the steps of:
    injecting a first carbon based material having a first metal based material and a second carbon based material having a second metal based material into a reaction area at a predetermined rate;
    dissociating carbon atoms from said carbon based materials at a predetermined rate;
    maintaining the reaction area at a predetermined temperature and a predetermined pressure, wherein said carbon nanotubes nucleate in said reaction area; and
    performing said injecting, dissociating and maintaining steps to nucleate said carbon nanotubes in said predetermined configuration.

11. The method of claim 10 further comprising the step of:
    repeating said step of performing said injecting, dissociating and maintaining steps for a plurality of cross-sectional layers with successive cross-sectional layers stacked on previous cross-sectional layers, wherein said predetermined configuration is determined by said plurality of cross-sectional layers.

12. The method of claim 10 further comprising the step of varying the rate of injection of said carbon based materials.

13. The method of claim 10 further comprising the step of varying the rate of dissociation from said carbon based materials.

14. The method of claim 10 further comprising the step varying said predetermined pressure and predetermined temperature.

15. The method of claim 10, wherein the step of dissociating is effectuated by one of a laser, an electron beam, and an electrical arc discharge unit.

16. The method of claim 10, further comprising the step of varying the concentration of one of said first metal based material and said second metal based material.

17. The method of claim 10, further comprising the step of adjusting the growth direction of said carbon nanotube during a growth period.

* * * * *